United States Patent [19]

McNaughton

[11] 4,109,190

[45] Aug. 22, 1978

[54] CIRCUIT FOR INCREASING THE OPERATING SPEED RANGE OF A VELOCITY SERVO SYSTEM

[75] Inventor: Lawrence S. McNaughton, Waynesboro, Va.

[73] Assignee: General Electric Company, New York, N.Y.

[21] Appl. No.: 755,930

[22] Filed: Dec. 30, 1976

[51] Int. Cl.² .............................................. G05B 11/36
[52] U.S. Cl. .................................. 318/609; 318/271; 318/326; 318/385; 318/400
[58] Field of Search ............... 318/609, 610, 621, 271, 318/272, 312, 317, 326, 327, 385, 391, 400

[56] References Cited

U.S. PATENT DOCUMENTS 3,809,452   5/1974   Heinz .................................. 318/271
3,870,939   3/1975   Robert ................................. 318/611

Primary Examiner—James R. Scott
Assistant Examiner—John J. Feldhaus
Attorney, Agent, or Firm—Stephen A. Young; Walter C. Bernkopf

[57] ABSTRACT

A velocity servo system for driving a motor to control the movement of a member. The system is comprised of means coupled to the motor for generating a signal indicative of the actual velocity of a member being driven by the motor, integrator means responsive to a commanded velocity signal indicative of the desired velocity of the member and to the actual velocity signal for generating a position error signal, and means responsive to the position error signal and the actual velocity signal for generating a signal to drive the motor.

3 Claims, 1 Drawing Figure

CIRCUIT FOR INCREASING THE OPERATING SPEED RANGE OF A VELOCITY SERVO SYSTEM

BACKGROUND OF THE INVENTION

1. Field of the Invention

This invention relates to a velocity control servo system, and, more particularly, to a circuit for increasing the accuracy, response and operating speed range of a velocity control servo system.

2. Description of the Prior Art

Prior art velocity control servo systems have in the past used a simple velocity loop that compared a commanded velocity signal, which is indicative of the desired velocity of movement of a member being controlled, with a signal indicative of the actual velocity of the member. Such a simple servo loop provided reasonably accurate dynamic and static control over a member which is moved by a motor over a maximum speed range having a ratio of approximately 1,000:1. In other words, reasonable control over speed and accuracy could be maintained as the speed of the motor varied from 1 RPM to a maximum of 1,000 RPM, or from 0.1% of the maximum speed to 100% of maximum speed of the motor. While such a range of control over the speed of the motor and the member being driven by the motor is acceptable for certain applications, there are other applications which require the range of speed over which accurate control can be maintained by the servo system to be at least a ratio of 10,000:1 or at times even exceed a ratio of 50,000:1.

OBJECT OF THE INVENTION

It is therefore an object of this invention to provide a velocity servo system having the capability of operating over an increased range of speed while still maintaining static and dynamic accuracy.

This and other objects of the invention will be pointed out hereinafter.

SUMMARY OF THE INVENTION

According to a broad aspect of the invention, there is provided a velocity servo system for driving a motor to control the movement of a member. The system is comprised of means coupled to the motor for generating a signal that is indicative of the actual velocity of the member being driven by the motor, integrator means responsive to a commanded velocity signal indicative of the desired velocity of movement of the member and to the actual velocity signal for generating a position error signal, and means responsive to the position error signal and the actual velocity signal for generating a signal to drive the motor. The integrator means is responsive to the difference between the commanded velocity signal and the actual velocity signal, and the means for generating a signal for driving a motor is comprised of a servo amplifier which is responsive to the difference between the position error signal and the actual velocity signal.

DESCRIPTION OF THE PREFERRED EMBODIMENT

Figure 1:
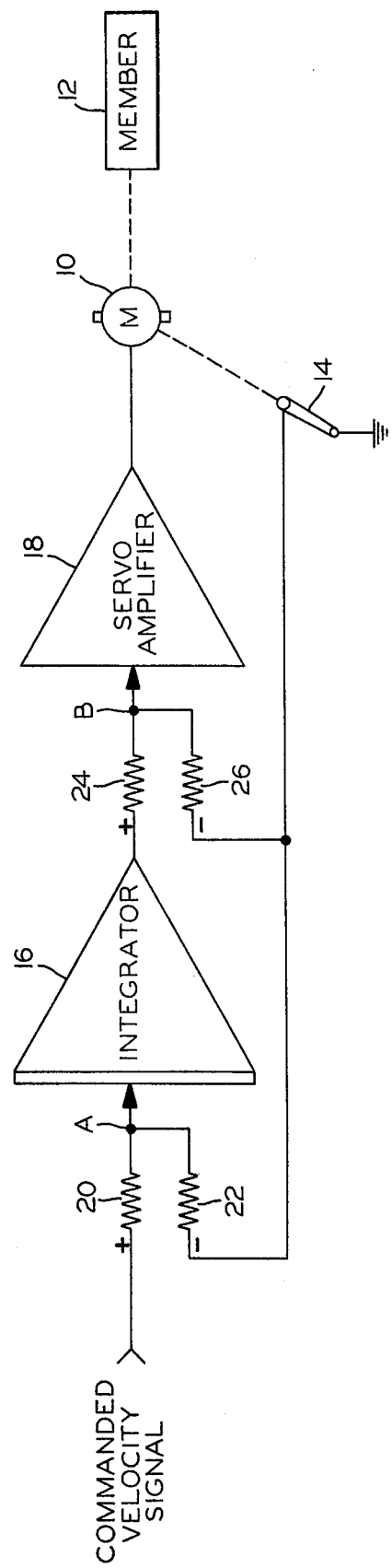
FIG. 1 is a diagram of the circuit used to enhance the range of speed control for the velocity servo system in accordance with the invention.

Referring now to FIG. 1, the invention will now be explained. In accordance with the invention, the velocity servo system for driving a motor 10 to control the movement of a member 12 is comprised of a tachometer 14, an integrator 16, a servo amplifier 18, a first pair of resistors 20 and 22, and a second pair of resistors 24 and 26.

In this embodiment, motor 10 is a standard DC servo motor whose output shaft can be used to control the rate of movement of member 12, wherein member 12 can be a tool or a part being machined or any other suitable object. Tachometer 14 is a DC tachometer, which is mechanically coupled to the output shaft of the motor in a conventional manner, and provides a means for generating a signal that is indicative of the actual velocity of the member which is being driven by the motor. In this instance, the actual velocity signal is an analog DC signal. By way of example only, the positive terminal of the tachometer can be connected to circuit ground, while the negative terminal of the tachometer can be used as its analog DC output. Resistors 20 and 22 have one end thereof connected to a summing junction A. The other end of resistor 20 is connected to receive a commanded velocity signal which is indicative of the desired velocity of movement of the member being controlled. In this instance, the commanded velocity signal is a DC analog signal initially having a positive polarity. If the polarity of the commanded velocity signal were initially negative, then the negative terminal of tachometer 14 could have been connected to circuit ground while its positive terminal could have been used as its output terminal. The other end of resistor 22 is connected to the negative terminal of the DC tachometer 14 so that the analog signal at summing junction A is indicative of the difference between the commanded velocity signal and the actual velocity signal. This resulting velocity error signal at summing junction A is applied to the input of integrator 16. Integrator 16 can be any standard integrating device such as a non-inverting operational amplifier which has a feedback capacitor connected between its input and output terminals. The integrator accumulates or integrates the the velocity error signal and provides a position error signal at its output terminal. Resistors 24 and 26 each have one end thereof connected together to form a summing junction B. The other end of resistor 24 is electrically connected to the DC output of integrator 16, while the other end of resistor 26 is electrically connected to the negative DC terminal of DC tachometer 14, whereby the signal at summing junction B is equal to the difference between the analog position error signal and the analog actual velocity signal. This difference signal is applied to the input of servo amplifier 18, which is a standard amplifier for generating a signal that is necessary to drive DC servo motor 10.

In operation, a commanded velocity signal is generated from punch tape or other convenient source, not shown, and applied to resistor 20, while the DC analog signal indicative of the actual velocity of motor 10 and member 12 is applied to resistor 22. A signal indicative of the difference between the commanded velocity signal and the actual veocity signal is applied from summing junction A to integrator 16. The output of integrator 16 is then a resulting analog position error signal. The difference between the analog position error and the actual velocity signal is obtained at summing junction B, and this difference signal is amplified by servo amplifier 18 to generate the signal necessary to drive motor 10 for controlling movement of member 12 within the desired velocity or speed range required by the commanded velocity signal, and within satisfactory levels of static and dynamic accuracy. Thus, the use of the additional loop formed by integrator 16 and resistors 20 and 22 results in the integrating of the smallest differences between commanded velocity and actual velocity signals, which results in modifying the command to the velocity control servo system, and thus corrects any resulting inaccuracies that might otherwise occur at increased speed ranges. The dynamics of this system thus provide a much faster response to load variations than would otherwise be possible when using prior art velocity control loops, the result of which is a velocity servo system which can drive a motor to control a member over a greatly enhanced speed range, i.e., at least at a ratio of 10,000:1 range of speed or even possibly greater than a ratio of 50,000:1 range of speed.

Although this invention has been described with reference to a specific embodiment thereof, numerous modifications are possible without departing from the invention, and it is desirable to cover all modifications falling within the spirit and scope of this invention.

What I claim as new and desire to secure by Letters Patent of the United States is:

1. A velocity servo system for driving a motor to control the movement of a member comprising:
   a. means coupled to the motor for generating a signal indicative of the actual velocity of the member being driven by the motor;
   b. integrator means, responsive to a commanded velocity signal indicative of the desired velocity of movement of the member and to the actual velocity signal, for generating a position error signal; and
   c. means responsive to the difference between the position error signal and the actual velocity signal for generating a signal to drive the motor.

2. A velocity servo system according to claim 1, wherein said integrator means is responsive to the difference between the commanded velocity signal and the actual velocity signal.

3. A velocity servo system according to claim 1, wherein the means for generating a signal to drive the motor is comprised of a servo amplifier responsive to the difference between the position error signal and the actual velocity signal.

* * * * *